US008164273B1

(12) United States Patent
Harrington et al.

(10) Patent No.: US 8,164,273 B1
(45) Date of Patent: Apr. 24, 2012

(54) LIGHT EMITTING DIODE CIRCUITS FOR GENERAL LIGHTING

(76) Inventors: Richard H. Harrington, Dexter, MI (US); Charles W. Krapf, Livonia, MI (US)

( * ) Notice: Subject to any disclaimer, the term of this patent is extended or adjusted under 35 U.S.C. 154(b) by 862 days.

(21) Appl. No.: 12/150,256

(22) Filed: Apr. 25, 2008

Related U.S. Application Data

(60) Provisional application No. 60/926,450, filed on Apr. 27, 2007.

(51) Int. Cl.
 *H05B 37/02* (2006.01)
(52) U.S. Cl. ......... 315/291; 315/250; 315/294; 315/307
(58) Field of Classification Search .......... 315/149–158, 315/250, 291, 294, 297, 307–308
See application file for complete search history.

(56) References Cited

U.S. PATENT DOCUMENTS

| | | | |
|---|---|---|---|
| 6,285,140 B1* | 9/2001 | Ruxton | 315/312 |
| 6,528,954 B1* | 3/2003 | Lys et al. | 315/291 |
| 7,271,802 B2* | 9/2007 | Wang et al. | 345/211 |
| 7,830,095 B2* | 11/2010 | Erhardt | 315/224 |
| 7,872,423 B2* | 1/2011 | Biery et al. | 315/149 |
| 2002/0171379 A1* | 11/2002 | Adamson | 315/312 |
| 2004/0135565 A1* | 7/2004 | Douma et al. | 323/283 |
| 2006/0119292 A1* | 6/2006 | Black et al. | 315/291 |
| 2008/0191631 A1* | 8/2008 | Archenhold et al. | 315/158 |
| 2011/0187276 A1* | 8/2011 | Shteynberg et al. | 315/186 |

* cited by examiner

*Primary Examiner* — Tung X Le
(74) *Attorney, Agent, or Firm* — Gifford, Krass, Sprinkle, Anderson & Citkowski, P.C.

(57) ABSTRACT

Improved electric circuits that minimize, or eliminate, energy losses in the supply of energy to and control of LEDs. Addition of diodes and a capacitor to a circuit reduces or eliminates LED blinking, creates smooth and continuous infinitely variable dimming. The components are added to supply power to each LED during the half of the AC cycle where it would normally be turned off. A first added diode allows an added capacitor to charge during the half cycle that the original diode is turned on, but does not allow the other half cycle to discharge the added capacitor. When the added capacitor is charged enough to turn on the original diode, it stays on throughout the AC cycle. The same relationship exists between the second added diode, the added capacitor and the second original diode. Zener diodes protect the LEDs from voltage surge's/spikes by shunting current around LEDs when the voltage exceeds the Zener diode's breakdown voltage. Micro processor controller with MOS FETs is ultra efficient and has next to zero power dissipation.

7 Claims, 19 Drawing Sheets

Current Probe Properties
Ratio of Voltage to Current     1    V/mA
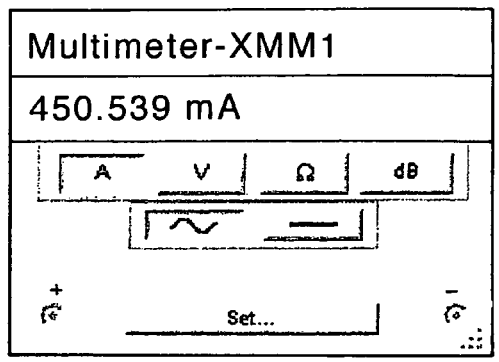
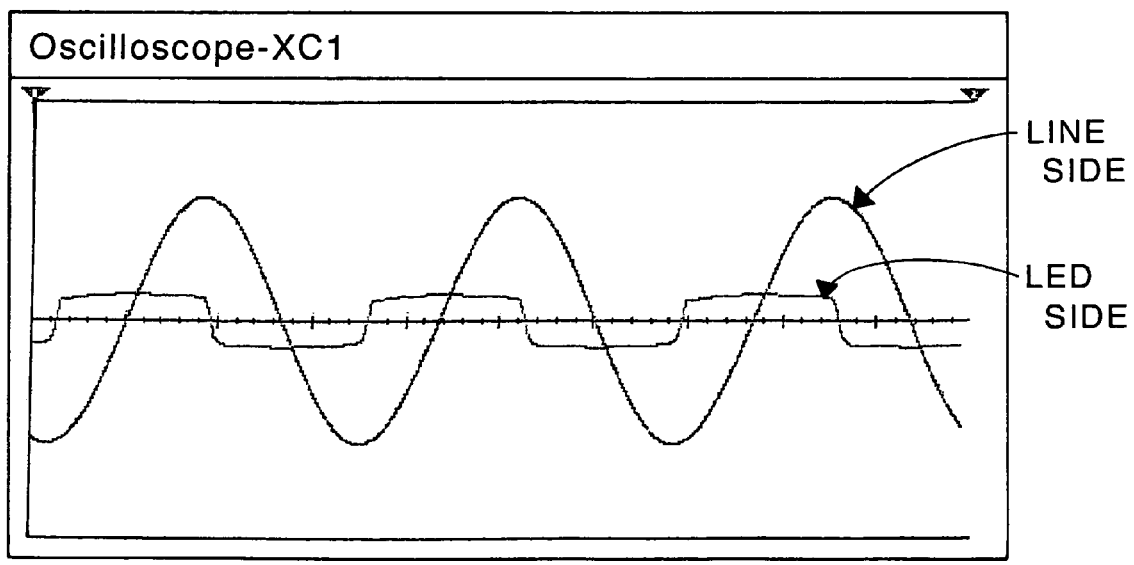
*FIG 6*

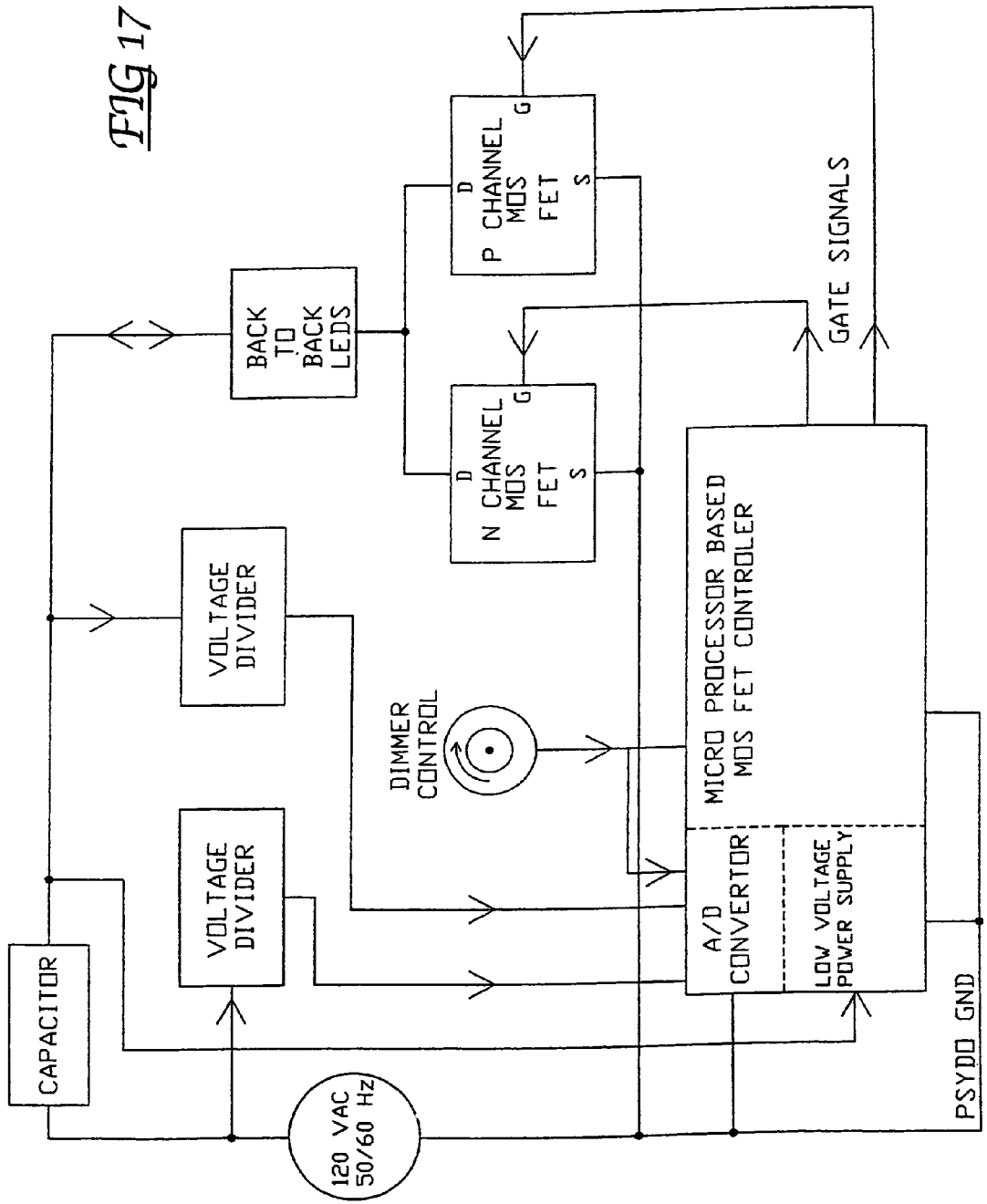

US 8,164,273 B1

LIGHT EMITTING DIODE CIRCUITS FOR GENERAL LIGHTING

REFERENCE TO RELATED APPLICATION

This application is based on provisional patent application Ser. No. 60/926,450, filed Apr. 27, 2007.

BACKGROUND OF THE INVENTION

The field of the invention pertains to electrical circuits for all light emitting diodes and, in particular, for "white" or substantially all of the visual spectrum light emitting diodes.

LEDs are semiconductor devices that produce light when a current is supplied to them. "White" light emitting diodes (LEDs) are LEDs that emit a full visual spectrum of light. Such LEDs took a considerable number of years to be developed and considerably more years to be brought to mass production. In particular, only recently have white LEDs with lumen outputs sufficient for general lighting and therefore replacement of incandescent or fluorescent lighting become available. White LEDs offer a very real reduction in energy cost in comparison with incandescent and fluorescent lights but also operate with a much lower temperature rise.

Unfortunately, because white LEDs operate at a few volts and general lighting operates at 110 volts AC RMS or 220 volts AC RMS, either strings of white LEDs in series or extensive and complicated passive (and sometimes active) electric circuit elements are employed to avoid the application of over voltages to the white LEDs. Blinking from power transient can be a problem. Another problem is that conventional (TRIAC) operated dimmers require the light to be turned on and then turned back down to a lesser brightness. What was needed was a smooth and continuous variable dimming of LEDs.

SUMMARY OF THE INVENTION

The invention comprises improved electric circuits that are highly efficient and minimize, if not substantially eliminate energy losses in the supply of energy to and control of white LEDs. LED can be prototype power line LED can be OPTEK OVSPW7CRB with custom heat sink rated at 350 mA continuous.

Addition of two diodes and two capacitors arranged into a circuit (FIG. 1) increases efficiency and can reduce or eliminate LED blinking. These components are designed into the circuit to supply power to each LED during the half of the AC cycle where it would normally be turned off. A first added diode allows a first added capacitor to charge during the half cycle that the original diode is turned on, but does not allow the other half cycle to discharge the added capacitor. When the added capacitor is charged enough to turn on the original diode, it stays on throughout the AC cycle. The same relationship exists between the second added diode, the second added capacitor and the second original diode.

The larger the added capacitor, the less variation there is in LED brightness, but the longer it takes for the LED to turn on initially. Filter capacitor in the circuit when simulated must be pretty large (4000 uF) and 160 mS is needed to turn on. Both LEDs stay on all the time but vary in brightness. Larger capacitors reduce flicker farther but take longer to turn on. Voltage on one of the filter capacitors increases with each AC cycle until the voltage reaches the operating voltage of the LED.

N channel and P channel Low Loss MOS FETs are used for the circuit (FIG. 8) to replace a small resistor in series with the Anode to Cathode connected LEDs. The purpose of the MOS FET's is to reduce the power dissipated in the resistor. Some form of current limiting is necessary during the switch activation which if not done at the Zero Crossing of the applied AC Waveform, will cause huge current spikes in the LEDs causing then to open up (catastrophic failure). Using a resistor in series with the LEDs will work, but will cause power to be wasted and cause the resistor to get hot. In the circuit, the power is applied to the capacitor when the power switch is turned on. Initially, the MOS FETs are turned off, and only leakage current flows through the LEDs (a few uA or less). When power is applied to the circuit, the rectifier passes the current to the Time Delay circuit if the voltage is such that the rectifier is forward biased. The Time Delay circuit will after some time turn on the MOS FET's so that current can flow through the CAPACITOR/LED circuit. The Time Delay is such that the transient of the switch closing is not seen, and the NMOS FETs are turned on in a gradual fashion.

The circuit also employs two Zener diodes connected in series with their cathodes tied together. With this configuration, the max Voltage drop is equal to the zener voltage plus the forward drop of one Zener diode. The two Zener diodes are then connected in parallel with the Anode to Cathode LED package so that if one LED opens up, the entire string does not go out (Christmas Tree Light Syndrome). The voltage drop across the series Zener diodes is chosen to be slightly greater than the voltage across the Back to Back LEDs. The Zener diodes protect the LEDs from voltage surges/spikes by shunting current around LEDs when the voltage exceeds the Zener diode's breakdown voltage.

1. This new Light Emitting Diode (LED) Dimmer is totally different from conventional TRIAC operated dimmers. This new dimmer is very energy efficient and also will work at all dimmer settings of the incoming AC line voltage. This makes it possible to operate at light levels that are just visible, and the diodes not have the annoying sudden "lights On" when turning the control from OFF to some ON level. This dimmer will instead turn the LEDs on very gradually.

2. In a block diagram of the new LED dimmer circuit (FIG. 17), the 120VAC connects directly to a Capacitor that supplies power to three blocks. The first block is the LOW VOLTAGE POWER SUPPLY that generates low voltage DC for use by the Micro Processor based MOS FET Controller. The second and third blocks are voltage dividers that divide the voltages by using two resistors so that the voltage going into the A/D Converter is within the operating range of the A/D. The two voltages are: the Capacitor input voltage (Line Voltage), and the second is the Capacitor output voltage.

3. The fourth block (discussed below) is the Back to Back LEDs. The reason that the LEDs are connected Anode to Cathode (Back to Back) is so the Capacitor can have a conduction path for both polarities of the incoming AC power. The Capacitor supplies all the current for the LEDs, and yet dissipates next to zero power. The power of the Capacitor would be classified in the "Dissipation Factor" which is less than 0.1% typical.

4. The Back to Back LEDs are connected to the parallel connected MOS FETs, one being an "N" channel and the other being a "P" channel. This is done so that both the negative side and the positive voltages of the incoming Line Voltage can be switched. The MOS FETs have a very low "ON" resistance making the Drain/Source voltage drop very low. Less than 100 mV is the typical ON voltage drop that calculates in to a 0.029 W Peak Power loss. This is an exceeding low number, and makes it so that the vast majority of the Power Dissipation is in the LEDs themselves.

5. The MICRO PROCESSOR BASED MOS FET CONTROLLER (FIG. 17) reads the instantaneous line voltage from its on-board A/D. The sequence of operation is:
   A. The Dimmer is turned from OFF to some ON value. The Dimmer can be a potentiometer or two push button switches.
   B. The Micro Processor senses that the LEDs want to turn on.
   C. The Micro Processor looks at the LINE VOLTAGE DIVIDER and also the CAPACITOR VOLTAGE DIVIDER. If the voltages match within some small value that is hard coded, the Micro Processor turns on one of the MOS FETs. Initially, the CAP voltage would be Zero volts, so the MOS FET would be turned on at Zero volts.
   D. Depending on the setting of the Dimmer Control, the Micro Processor turns off the N Channel MOSFET, and stores the Line Voltage and the Capacitor Voltage in RAM. (As an example +40V is used).
   D. When the Live voltage has gone up to the +160v and is coming back down, the Micro Processor turns ON the N Channel MOS FET at +40V. Doing this makes it so that only a very small (or no) current transient will occur in the Capacitor/LED circuit.
   F. At the Zero Voltage Crossing point, the Micro Processor turns off the N channel MOS FET, and turns on the P Channel MOS FET. At −40V, the Micro Processor turns OFF the P Channel Micro Processor MOS FET and waits for it to go to −160 V and then back to −40V. At −40V, the P Channel turns back on and stays on until Zero Cross.
   6. G. Go to 5 D, and repeat.
7. Section 5 makes it so the Capacitor does not have Step Function changes in voltage which will cause very large current transients in the LEDs.

For a more complete understanding of the present invention, reference is made to the following detailed description when read with in conjunction with the accompanying drawings wherein like reference characters refer to like elements throughout the several views, in which:

BRIEF DESCRIPTION OF THE DRAWINGS

FIG. 6 illustrates voltage vs. time for Capacitor C1 in the circuit of FIG. 1;
FIG. 15b. illustrates the Zener circuit for the light array of FIG. 15a;
FIG. 16a illustrates a simple circuit for a three-stage LED light dimmer circuit;
FIG. 16b illustrates a truth table for the LED light dimmer of FIG. 16a;
FIG. 17 illustrates a block diagram for a substantially infinitely variable LED light dimmer.

DESCRIPTION OF THE PREFERRED EMBODIMENTS

Figure 1:
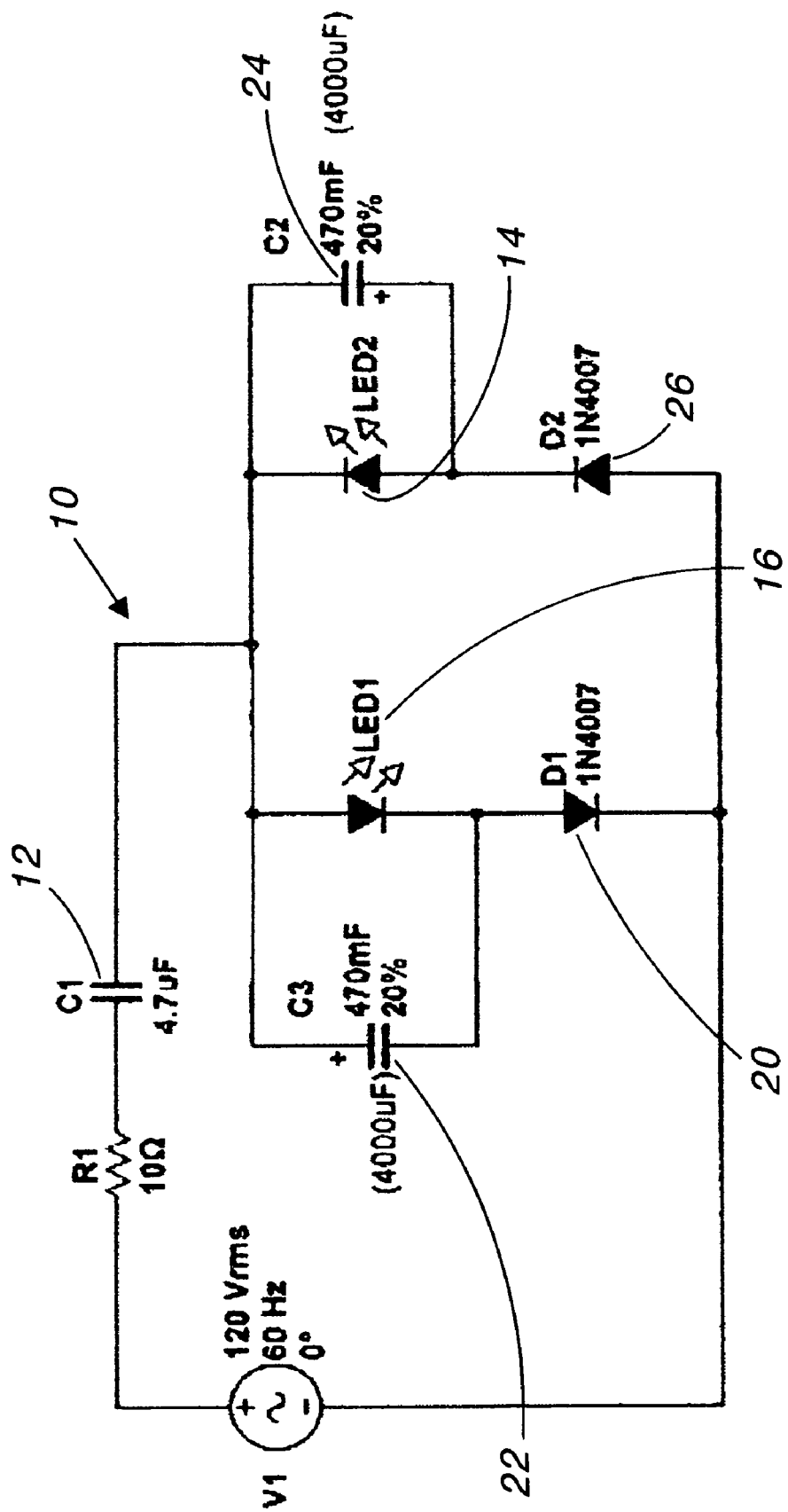
FIG. 1 illustrates a circuit to control LED blinking.

Illustrated in FIG. 1 is simulated LED power supply circuit 10 to control blinking having typical AC voltage with capacitor 12 selected to provided the necessary current for the LEDs 14, 16. Addition of two diodes 20 and 26 with capacitors 22, 24 to circuit 10 as shown reduces or eliminates LED blinking. Capacitors 22 and 24 are filter capacitors. Diodes 20 and 26 and capacitors 22 and 24 are added to supply power to each LED during the half of the AC cycle where each LED would normally be turned off. Diode 20 allows capacitor 22 to charge during the half cycle that diode 16 is turned on, but does not allow the other half cycle to discharge capacitor 22. When capacitor 22 is charged enough to turn on diode, 16 it stays on throughout the AC cycle. The same relationship exists between diode 26, capacitor 24 and diode 14.

The larger the capacitors 22 and 24, the less variation there is in LED brightness, but the longer it takes for the LED to turn on initially. Filter capacitor in the circuit is large as (4000 uF) and 160 mS is needed to turn on.

Figure 2:
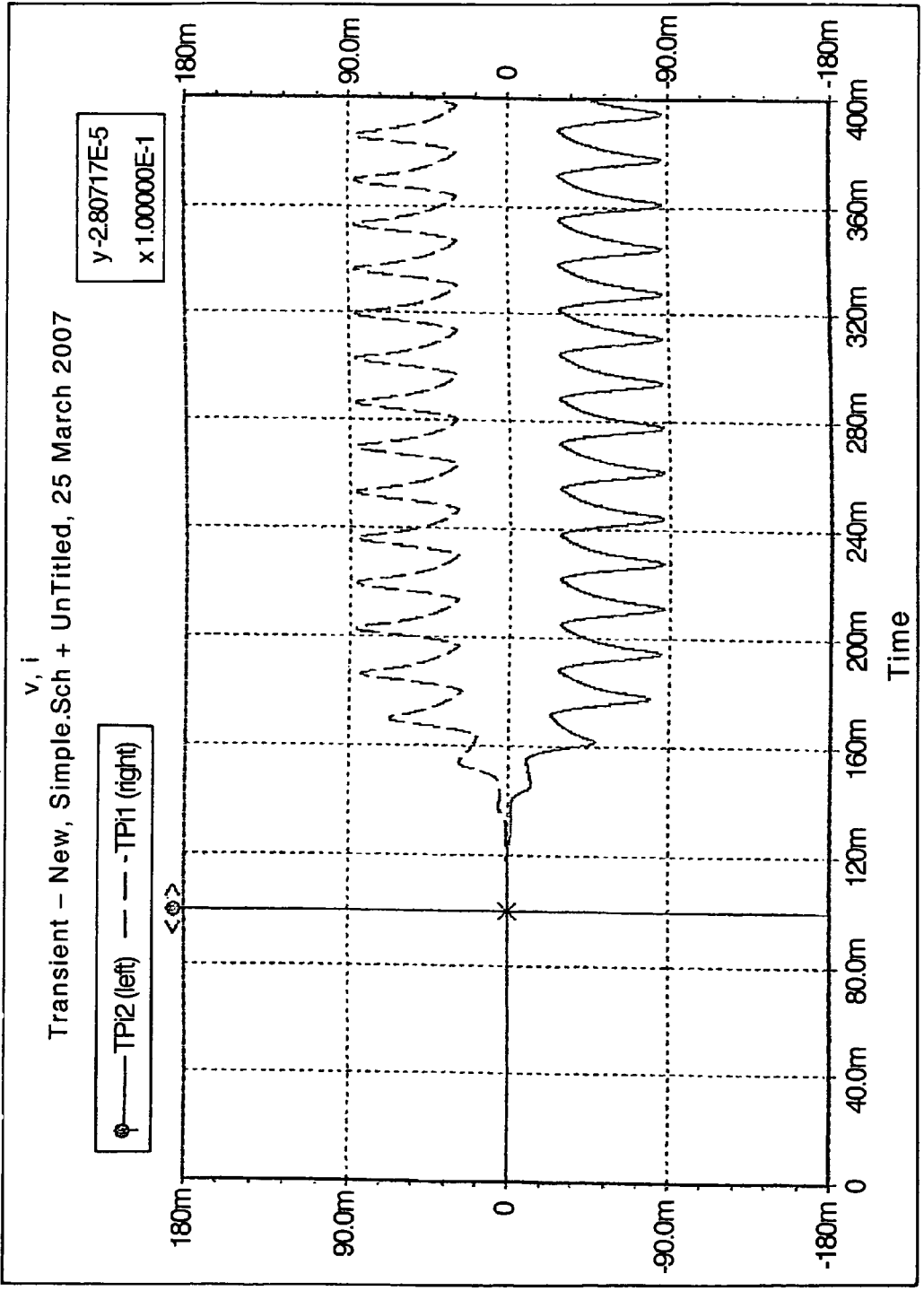
FIG. 2 illustrates LED current vs. time for the circuit of FIG. 1.
Figure 3:
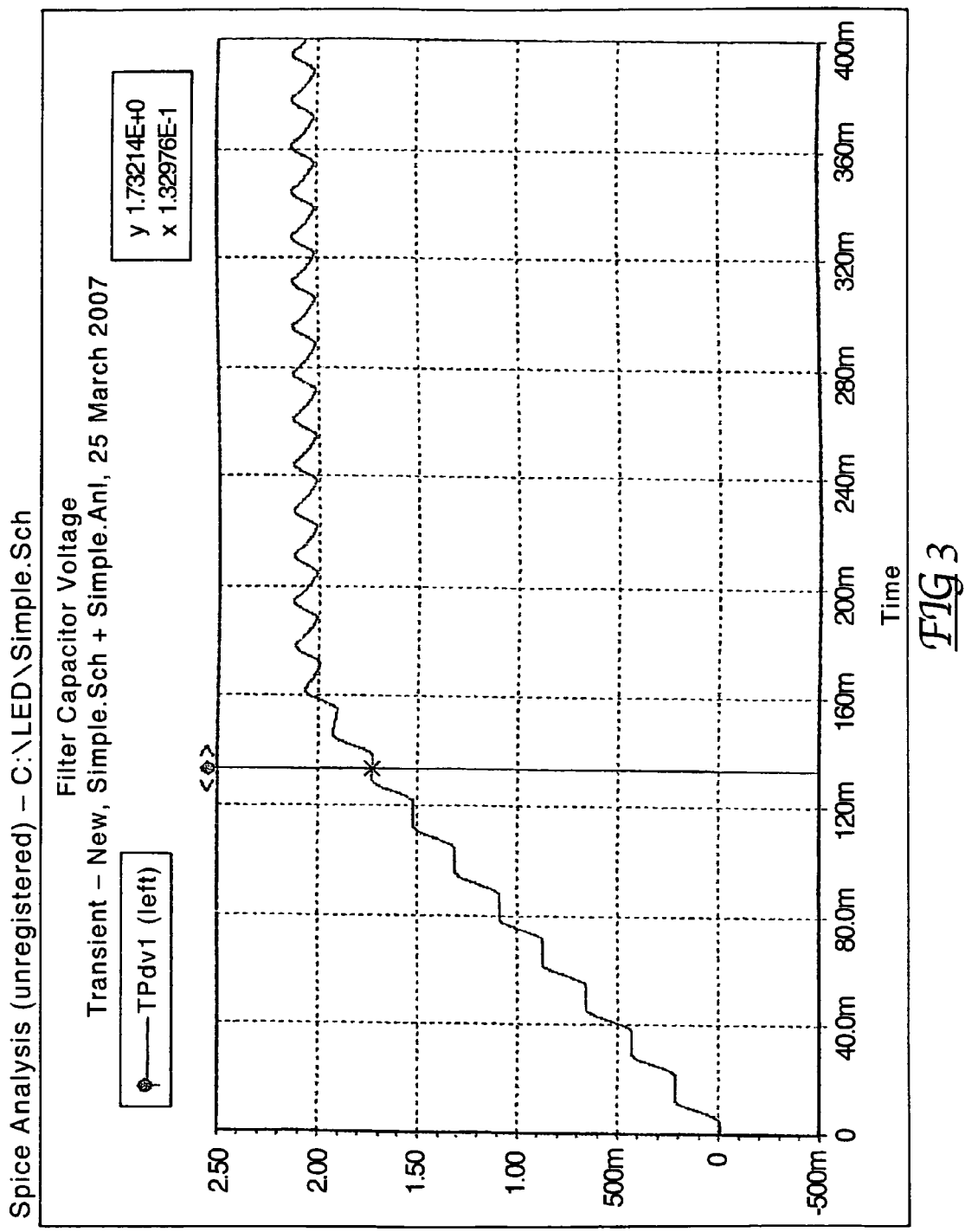
FIG. 3 illustrates voltage on one of the filter capacitors for the circuit of FIG. 1.
Figure 4:
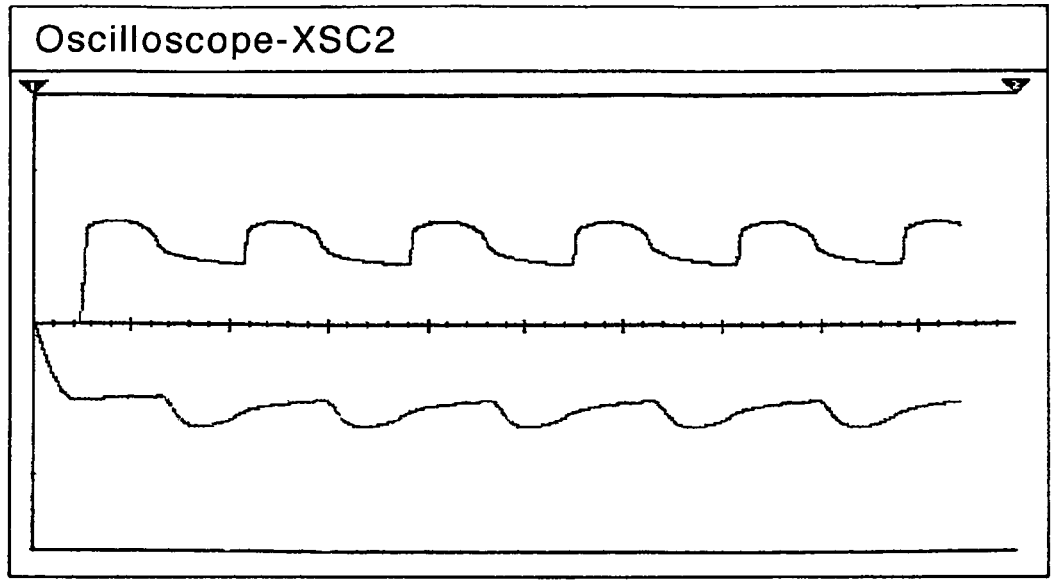
FIG. 4 illustrates voltage vs. time for capacitor C2 in the circuit of FIG. 1.
Figure 5:
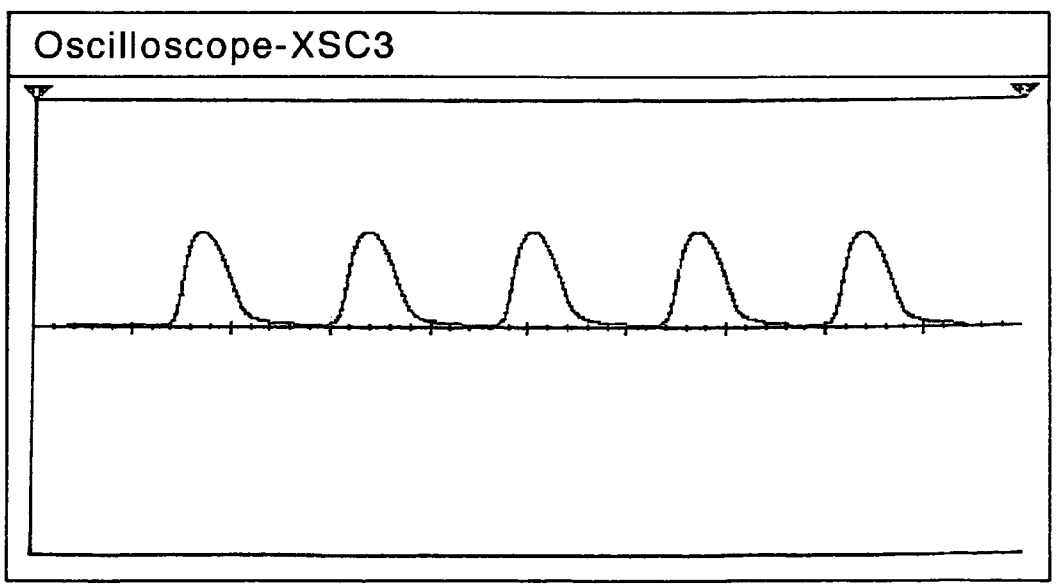
FIG. 5 illustrates voltage vs. time for capacitor C3 in the circuit of FIG. 1.
Figure 7:
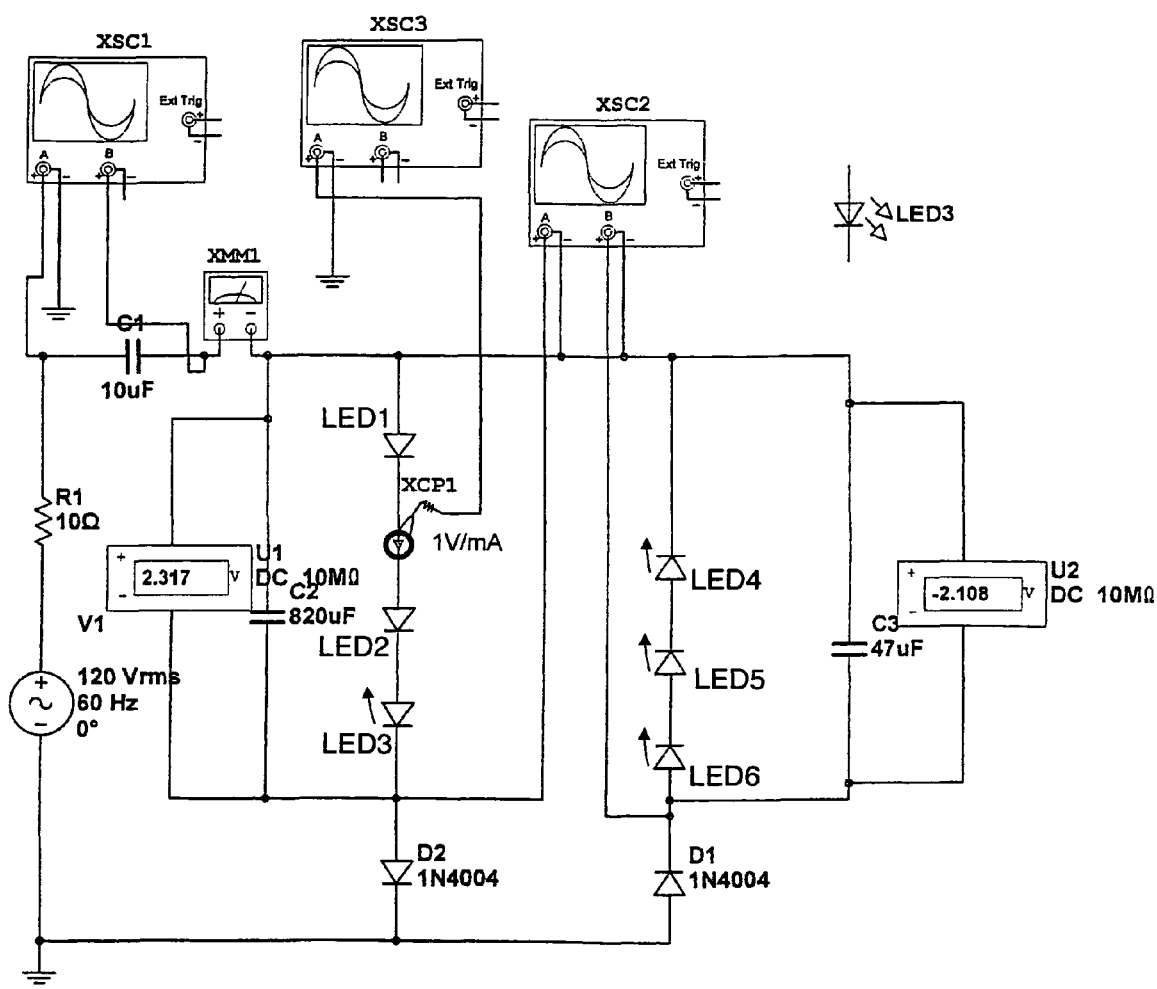
FIG. 7 illustrates the addition of multiple diodes for added LEDs in the circuit of FIG. 1.

Analysis results of circuit 10 of FIG. 1 are depicted in FIGS. 2-7. Current displays differently through each LED (FIG. 2). Voltage on one of the filter capacitors for circuit 10 is shown in FIG. 3. Voltage vs. time for capacitor 22 in the circuit 10 is shown in FIG. 4. FIG. 5 illustrates voltage vs. time for capacitor 24 in circuit 10 of FIG. 1. Voltage vs. time for capacitor 12 in circuit 10 is depicted in FIG. 6. Illustrated in FIG. 7 is addition of multiple diodes for added LED's in circuit 10 of FIG. 1.

Figure 8:
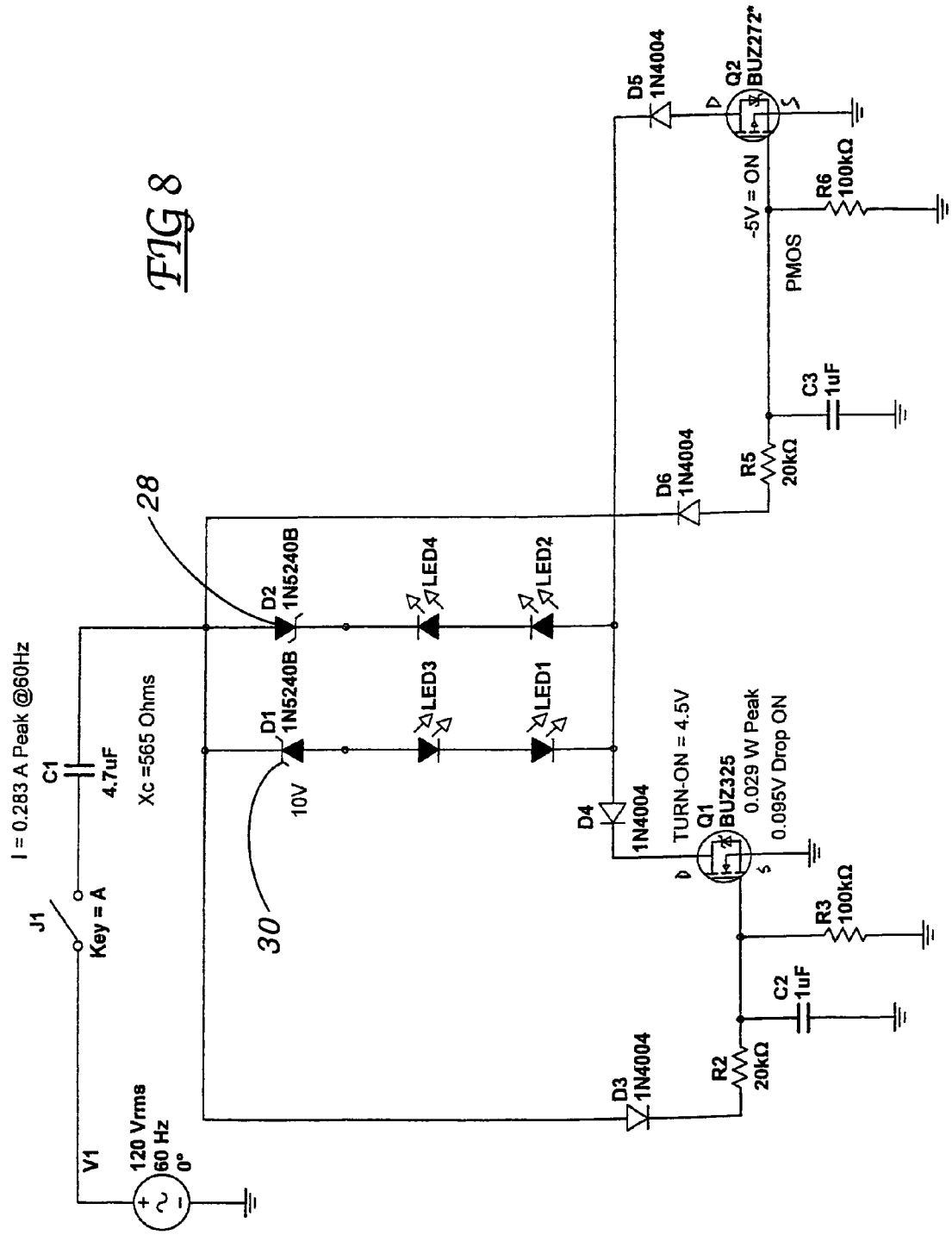
FIG. 8 illustrates a circuit with transistors (MOS FET) to reduce power consumption in the circuit.
Figure 9:
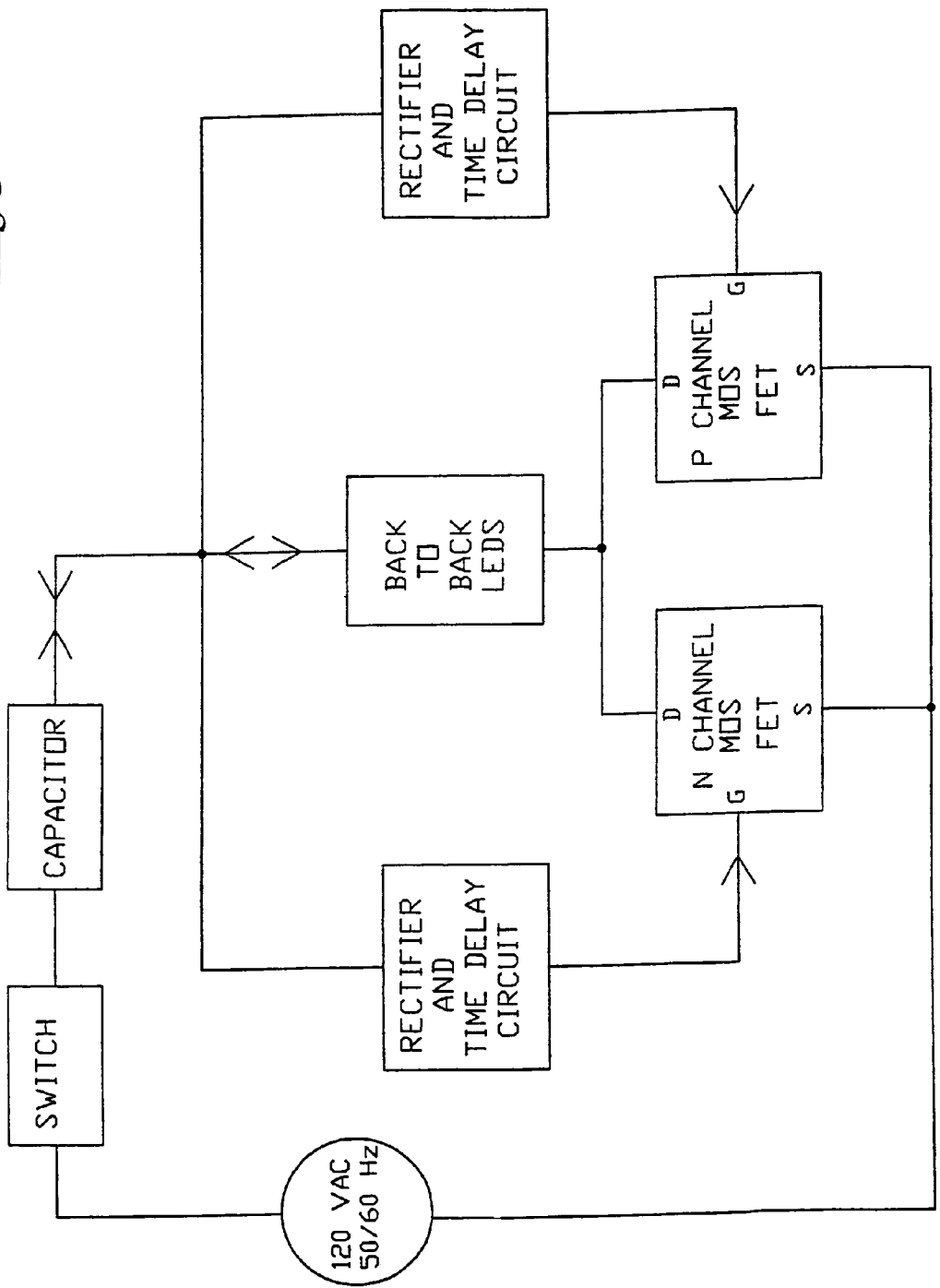
FIG. 9 illustrates a block diagram of the circuit in FIG. 8.

Now turning to FIG. 8, thereshown is circuit 10 employing transistors (MOS FET) to reduce power consumption in circuit 10. Circuit 10 of FIG. 8 is better shown in block diagram in FIG. 9.

Figure 10:
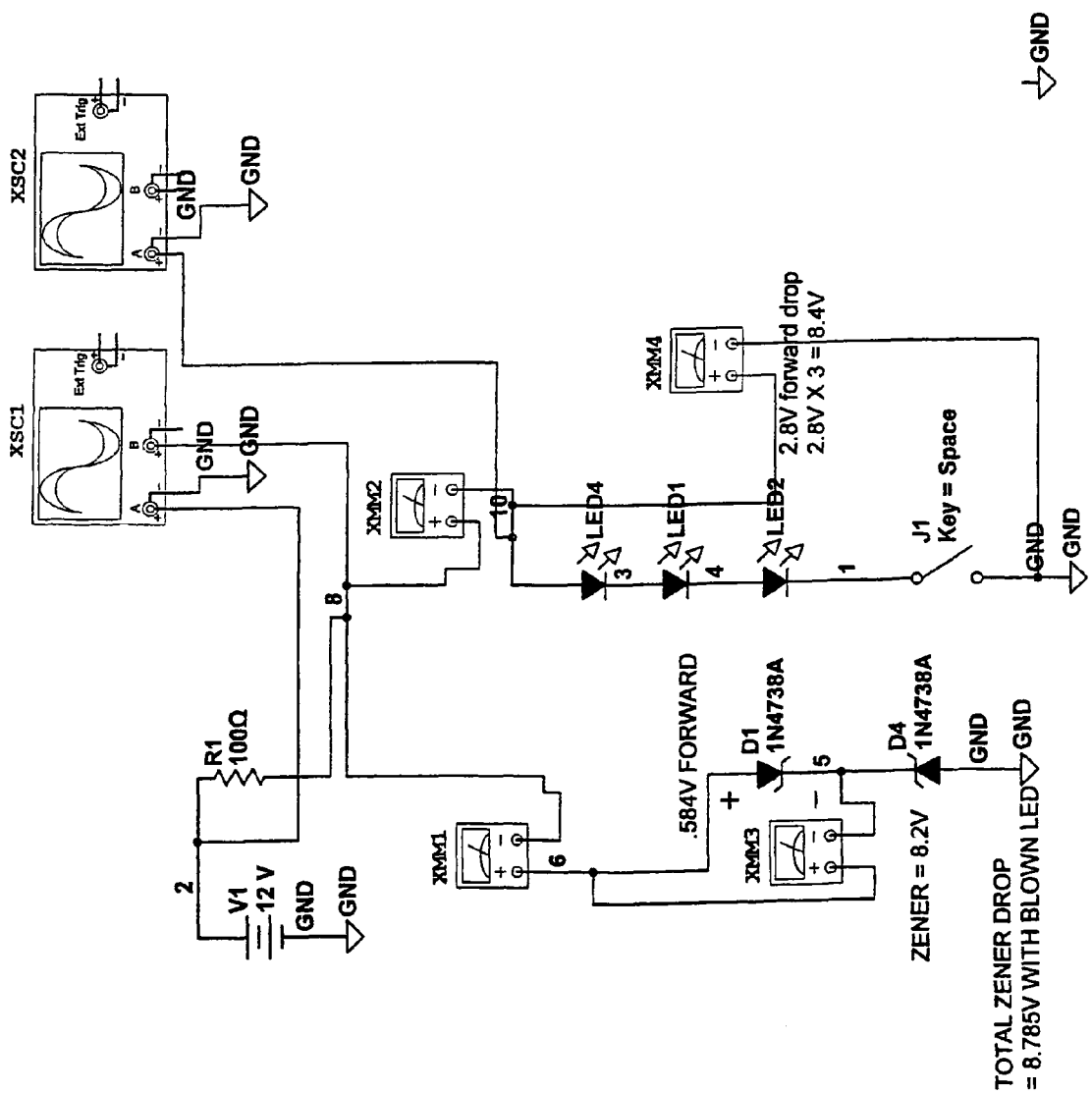
FIG. 10 illustrates a circuit with Zener diodes to protect circuit against LED failure or voltage spikes.
Figure 11:
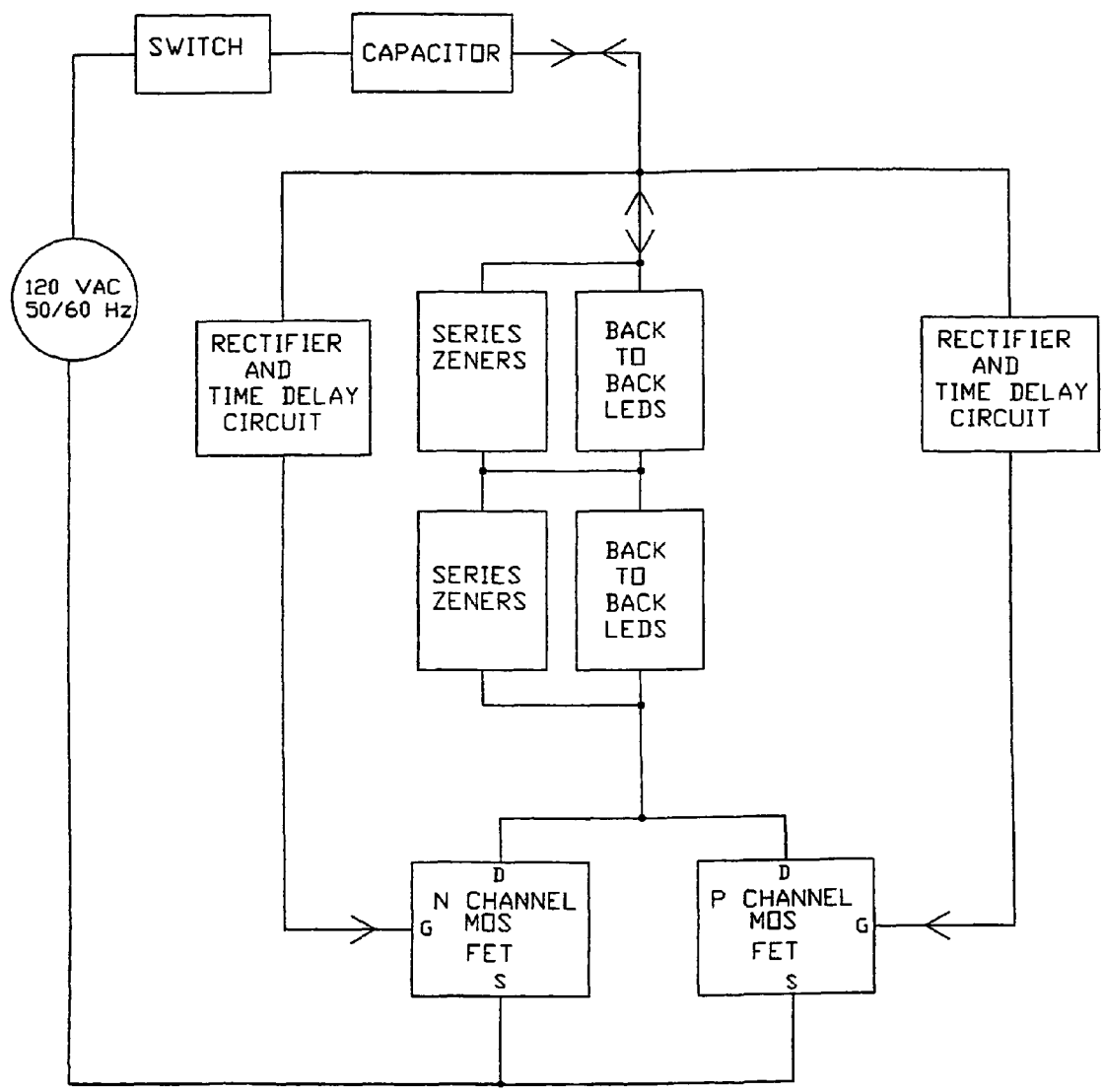
FIG. 11 illustrates a block diagram of a more sophisticated Zener protected circuit.
Figure 12A:
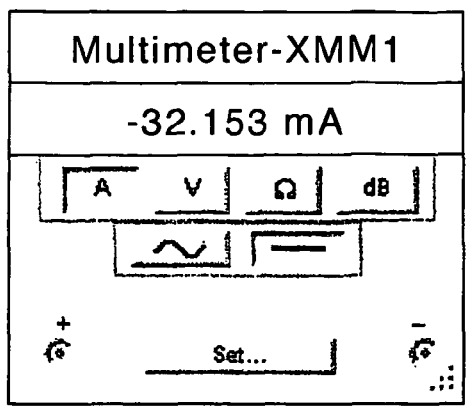
FIGS. 12a, 12b, 12c and 12d illustrate typical multi-meter readings for the circuit in FIG. 10.
Figure 12B:
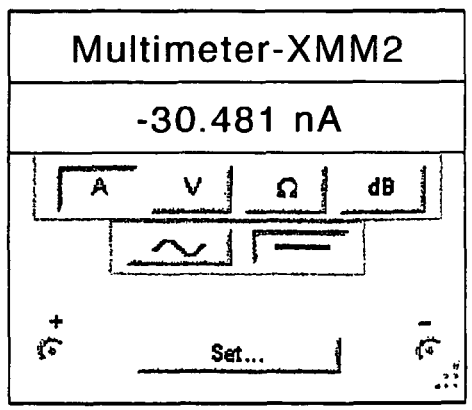
Figure 12C:
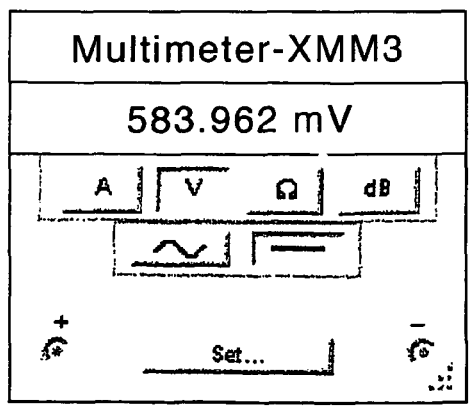
Figure 12D:
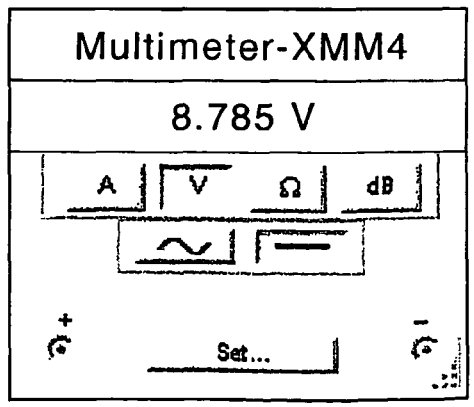
Figure 13:
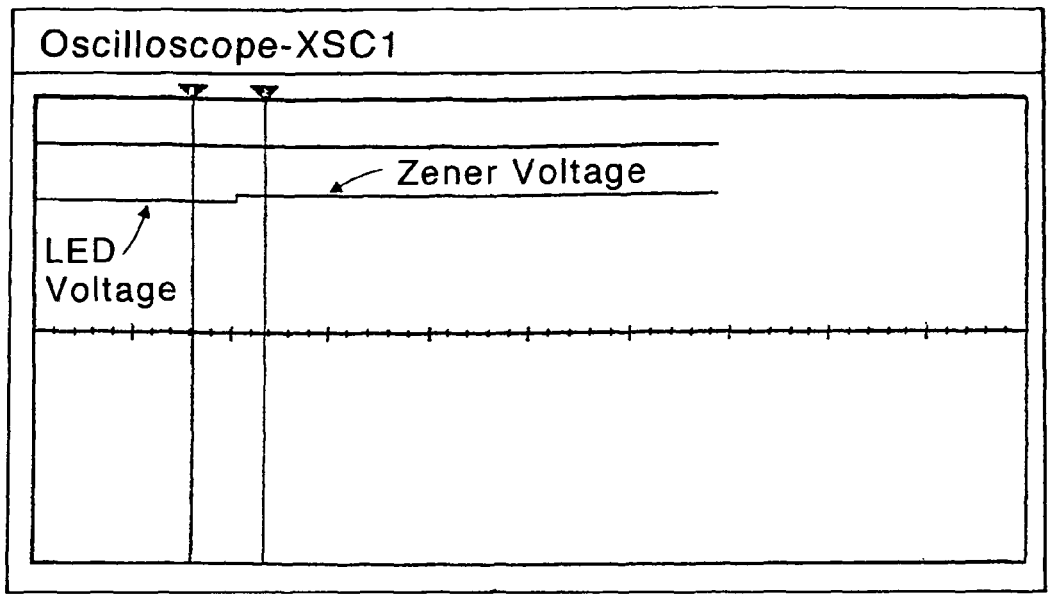
FIG. 13 illustrates the step in Zener voltage in the circuit of FIG. 10.
Figure 14:
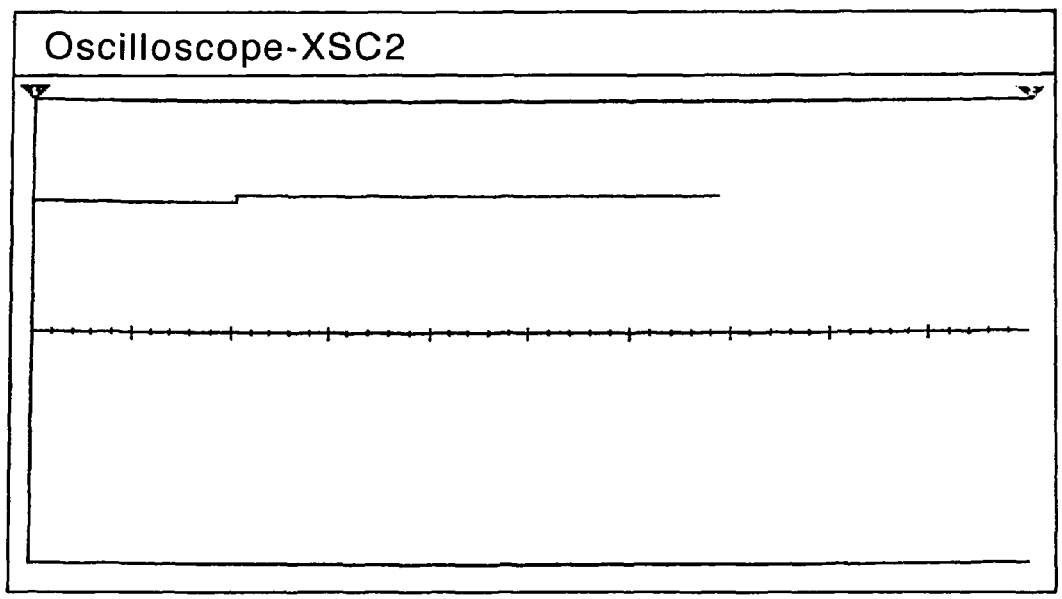
FIG. 14 illustrates the step in LED string voltage in the circuit of FIG. 10.
Figure 15A:
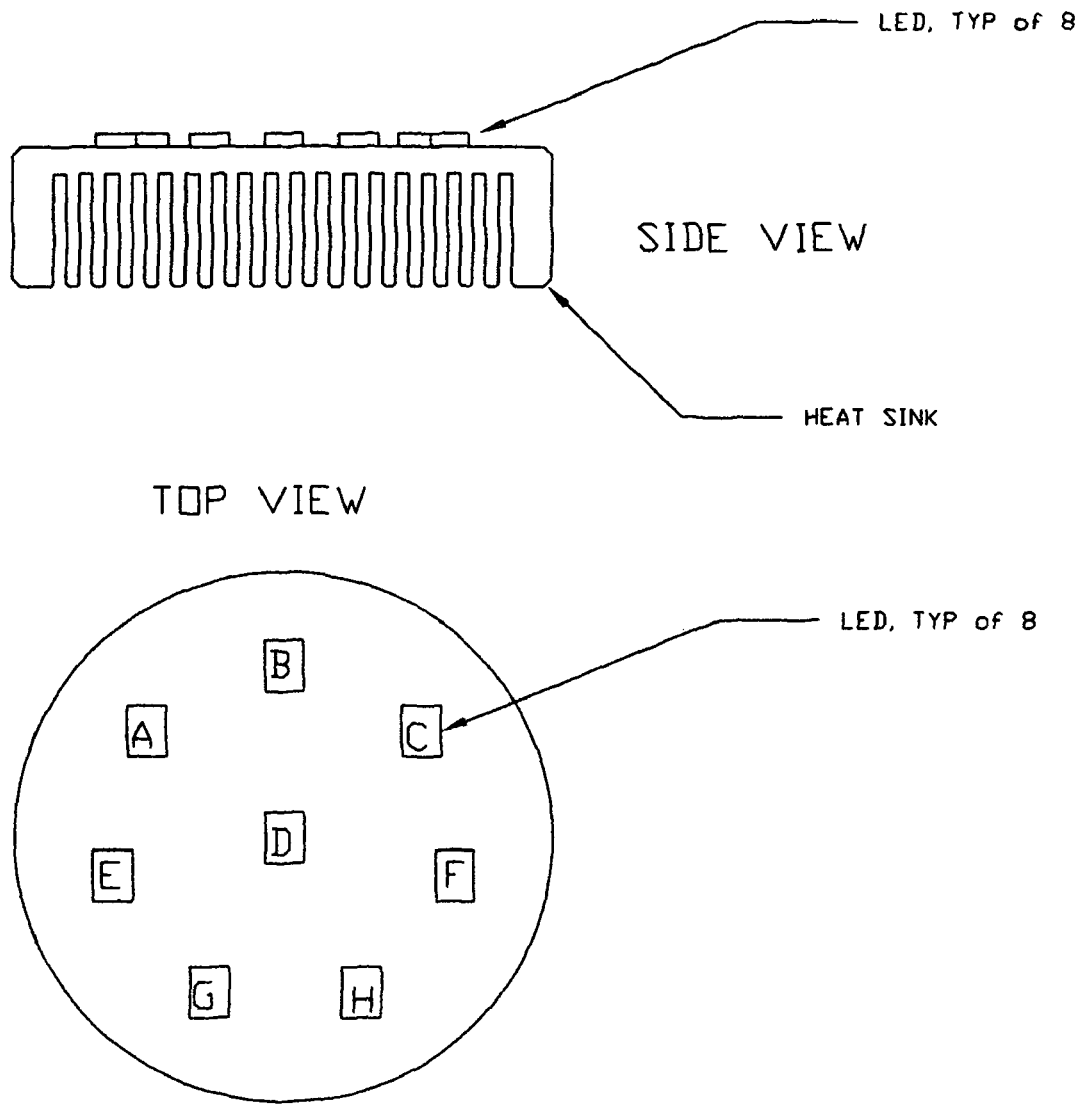
FIG. 15a illustrates the back of an 8 LED light array for general illumination.
Figure 15B:
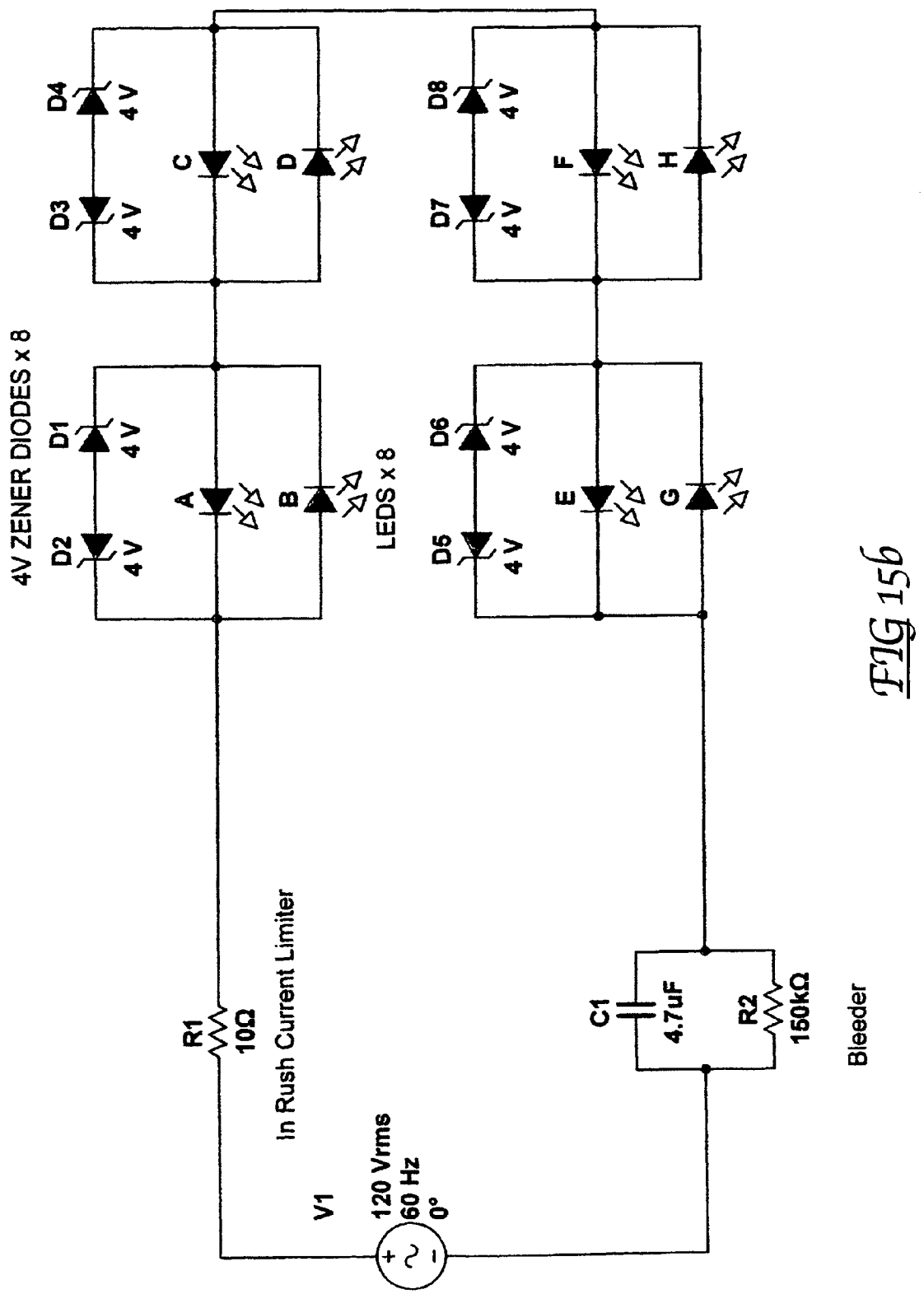

Circuit 10 using Zener diodes 28, 30 to protect against LED failure or voltage spikes is illustrated in FIG. 10, while FIG. 11 shows a more sophisticated Zener protected analog circuit 10 in block diagram. Elimination of power transient is shown in an analog circuit FIG. 11 and in a digital circuit FIG. 18. Typical multi-meter readings for points in the circuit of FIG. 10 are depicted in FIGS. 12a, b, 12c and 12d. Step in Zener voltage in circuit 10 of FIG. 10; is shown in FIG. 13 while FIG. 14 illustrates step in LED string voltage in circuit 10 of FIG. 10. Back of 8 LED light array for general illumination is illustrated in FIG. 15*a*. Zener circuit for light array of FIG. 15*a* is shown in FIG. 15*b*.

Figures 16A, 16B:
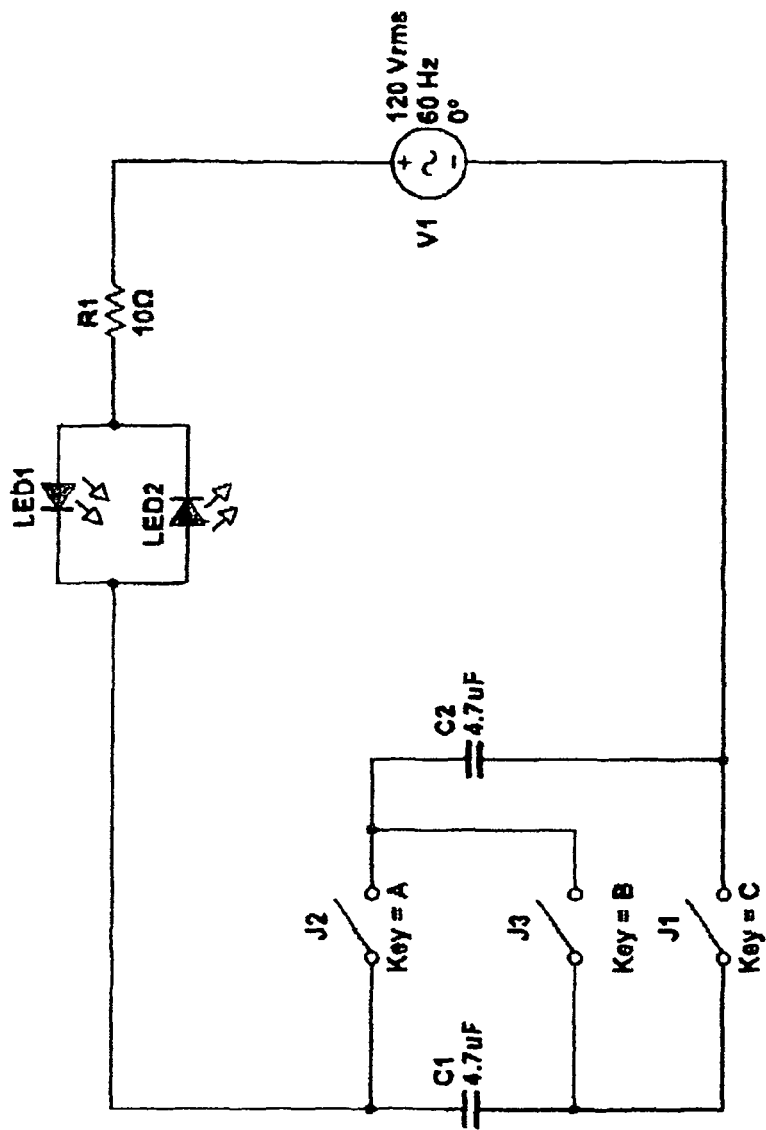

Simple circuit for a three-stage LED light dimmer circuit is shown in FIG. 16*a*. Truth table for LED light dimmer circuit of FIG. 16*a* is depicted in FIG. 16*b*.

Figure 18:
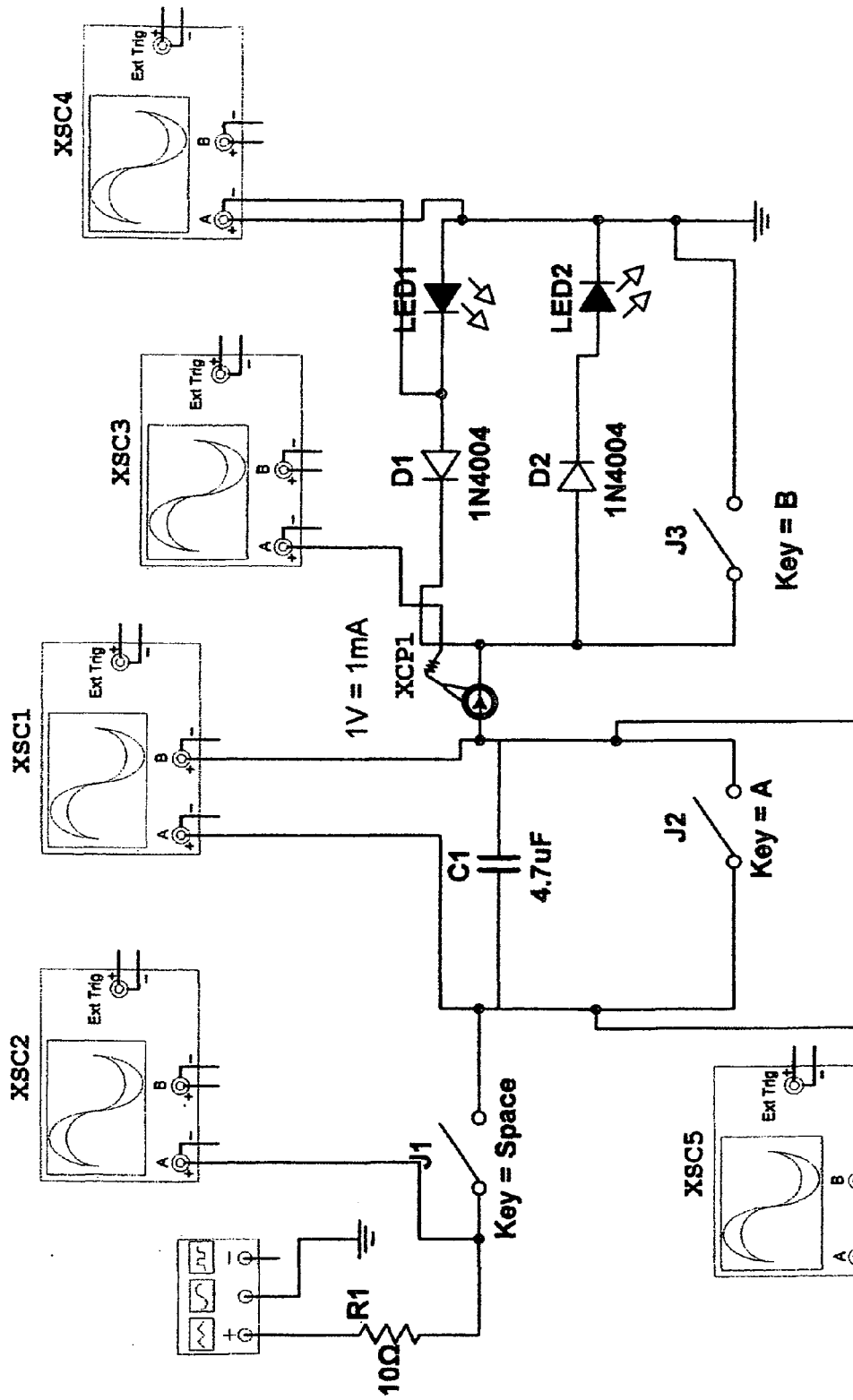
FIG. 18 illustrates a simulation circuit of invention of FIG. 17.

Substantially infinitely variable LED light dimmer is depicted in block diagram in FIG. 17. Circuit of FIG. 18 replicates block diagram of FIG. 17 for simulation purpose. Results of circuit of FIG. 18 are shown in graphs FIGS. 18*a*, 18*b*, 18*c* and 19 with power ON at zero cross, OFF at voltage X, ON at voltage X, OFF at voltage Y and ON at voltage Y.

Figure 18A:
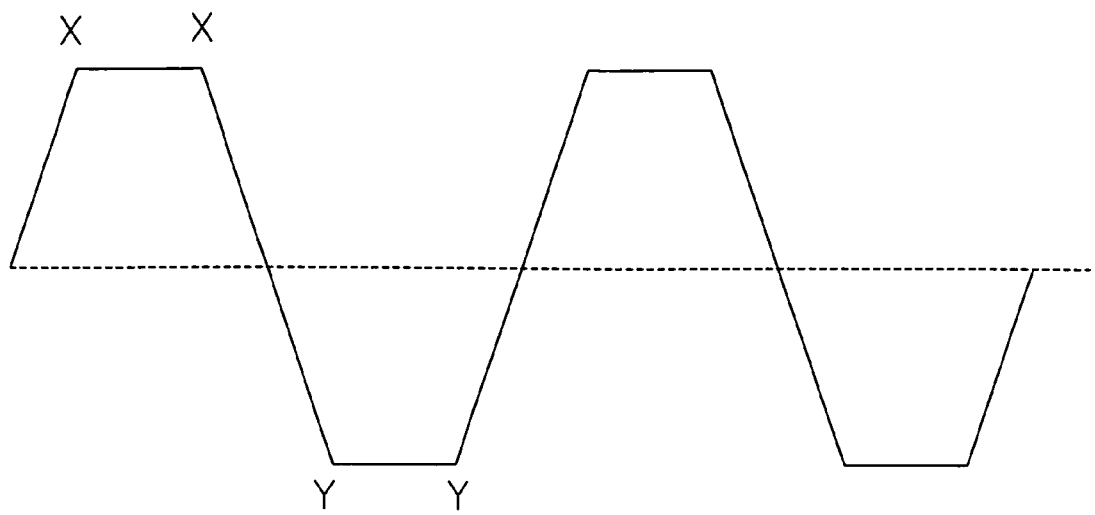
FIG. 18a illustrates a graph of capacitor voltage for the light dimmer of FIG. 17.
Figure 18B:
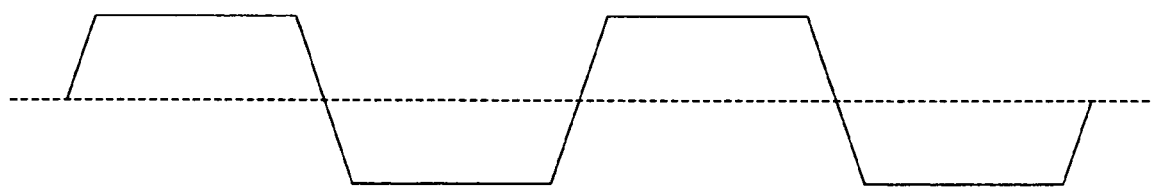
FIG. 18b illustrates a graph of capacitor plus LED voltage for the light dimmer of FIG. 17.
Figure 18C:
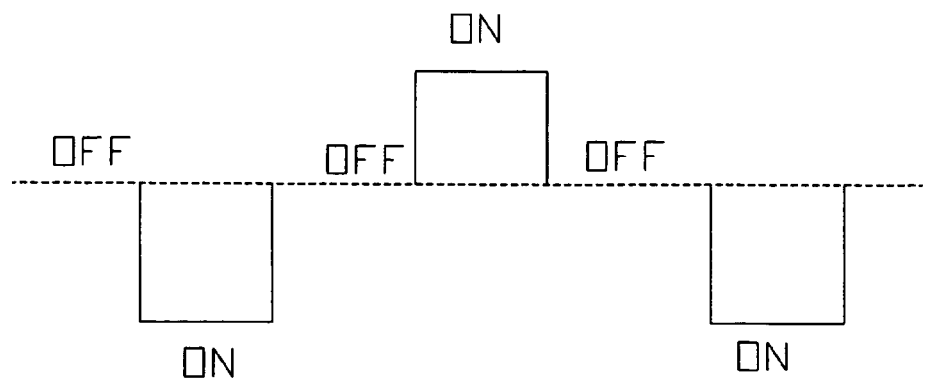
FIG. 18c illustrates a graph of capacitor plus LED current for the light dimmer of FIG. 17.

Capacitor voltage for the light dimmer of FIG. 17 is depicted in graph FIG. 18*a*. Capacitor plus LED voltage for the light dimmer of FIG. 17 is shown in graph FIG. 18*b*. Capacitor plus LED current for the light dimmer of FIG. 17 is depicted in FIG. 18*c*.

Figure 19:
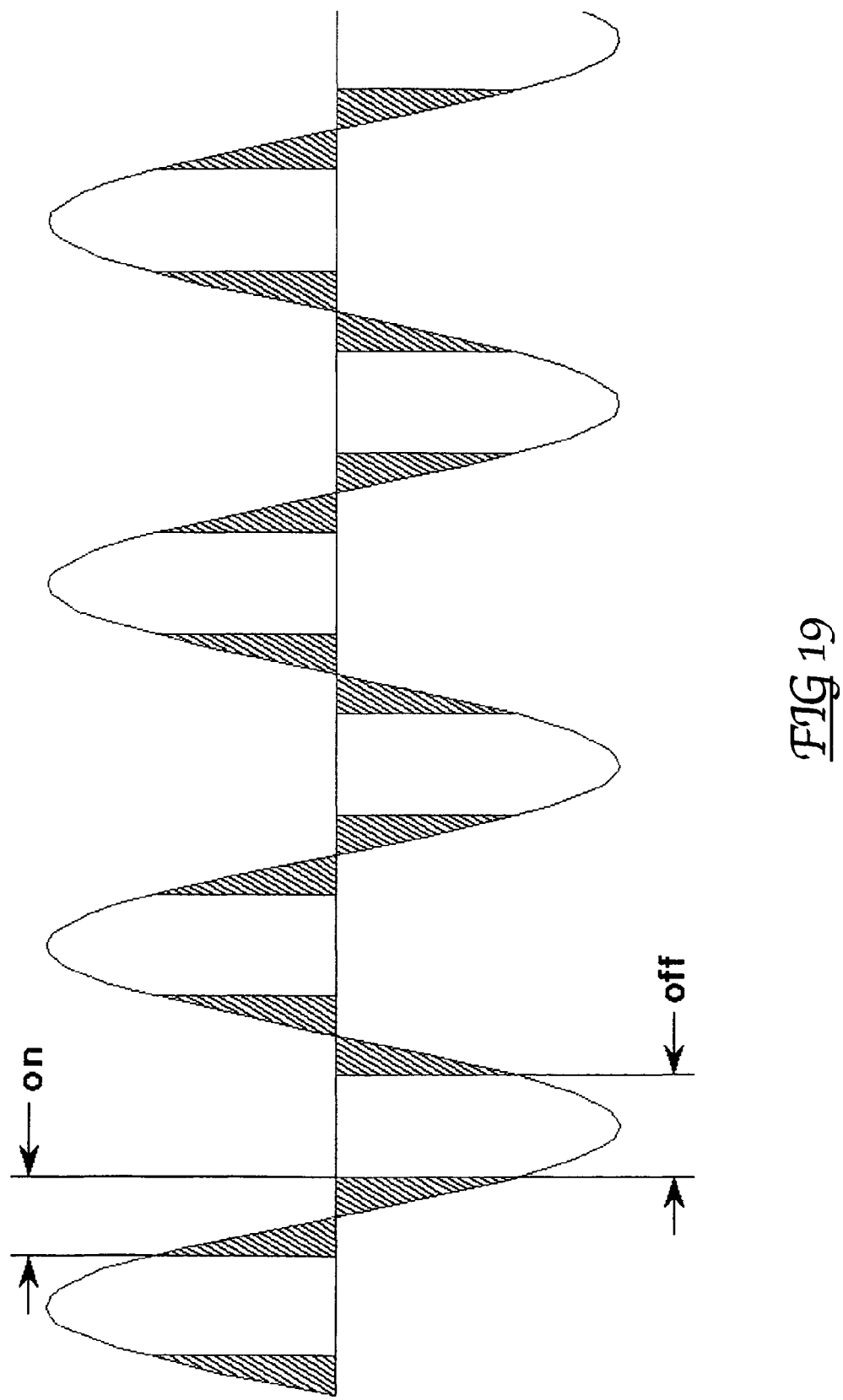
FIG. 19 illustrates a graph of the on and off portions of the sinusoidal input for the dimmer of FIG. 17.

On and off portions of the sinusoidal input for the dimmer of FIG. 17 are shown in the graph of FIG. 19 using MOS FETs.

Having described the invention, many modifications thereto will become apparent to those skilled in the art to which it pertains without deviation from the spirit of the invention as defined in the appended claims.

The invention claimed is:

1. Electrical apparatus for dimming back-to-back light-emitting diodes (LEDs) powered by an alternating current (AC) line voltage, the apparatus comprising:
    a dimmer control enabling a user to adjust the light produced by the LEDs to a desired brightness level;
    a pair of electrically controlled switches connected in parallel with one another, and with switches in parallel being connected in series with the LEDs;
    a voltage divider outputting a signal representative of the AC line voltage; and
    a control circuit in electrical communication with the dimmer control, the voltage divider and the electrically controlled switches, the control circuit being operative to independently control the electrically controlled switches to achieve and maintain the desired brightness level as a function of the signal received from the voltage divider.

2. The electrical dimming apparatus of claim 1, further including a memory for storing line voltage and phase angle infoiniation, thereby enabling the control circuit to control the electrically controlled switches in accordance with phase angle.

3. The electrical dimming apparatus of claim 1, wherein:
    the control circuit is a digital controller; and
    further including an analog-to-digital converter for converting the signal from the voltage divider into digital form.

4. The electrical dimming apparatus of claim 1, the control circuit is a digital controller powered by the AC line.

5. The electrical dimming apparatus of claim 1, wherein the electrically controlled switches are n- and p-channel MOSFETs.

6. The electrical dimming apparatus of claim 1, further including a capacitor in series with the LEDs for powering the LEDs.

7. The electrical dimming apparatus of claim 1, further including:
    a capacitor in series with the LEDs for powering the LEDs; and
    a second voltage divider connected between the capacitor and the LEDs enabling the control circuit to adjust the control of the switches in accordance with voltage magnitude or phase differences caused to the capacitor.

* * * * *